(12) United States Patent
Kubota et al.

(10) Patent No.: US 7,114,241 B2
(45) Date of Patent: Oct. 3, 2006

(54) METHOD OF MANUFACTURING A MAGNETIC HEAD DEVICE

(75) Inventors: Kazuyoshi Kubota, Mishima-gun (JP); Masayuki Hamakawa, Mishima-gun (JP)

(73) Assignee: Western Digital (Fremont), Inc., Fremont, CA (US)

( * ) Notice: Subject to any disclaimer, the term of this patent is extended or adjusted under 35 U.S.C. 154(b) by 0 days.

(21) Appl. No.: 09/990,408

(22) Filed: Nov. 21, 2001

(65) Prior Publication Data

US 2003/0074785 A1 Apr. 24, 2003

Related U.S. Application Data

(62) Division of application No. 09/438,346, filed on Nov. 11, 1999, now abandoned.

(30) Foreign Application Priority Data

Nov. 11, 1998 (JP) ............................................. 10-320868

(51) Int. Cl.
*G11B 5/127* (2006.01)
*H04R 31/00* (2006.01)

(52) U.S. Cl. ................................ 29/603.16; 29/603.07; 29/603.11; 29/603.13; 29/603.14; 29/603.15; 29/603.18; 29/417; 360/235.2; 451/5; 451/41

(58) Field of Classification Search .............. 29/603.07, 29/603.11, 603.13–603.17, 412, 417; 360/235.2; 451/5, 41

See application file for complete search history.

(56) References Cited

U.S. PATENT DOCUMENTS

| 4,814,921 | A | * | 3/1989 | Hamakawa et al. ........ 360/126 |
| 5,083,365 | A | | 1/1992 | Matsumoto |
| 5,764,446 | A | | 6/1998 | Seagle |
| 5,781,377 | A | | 7/1998 | Koka et al. |
| 5,805,380 | A | | 9/1998 | Ishihara et al. |
| 5,943,187 | A | | 8/1999 | Chen et al. |
| 6,081,408 | A | | 6/2000 | Partee |
| 6,081,991 | A | | 7/2000 | Tsunoda et al. |
| 6,093,083 | A | * | 7/2000 | Lackey ......................... 451/28 |
| 6,188,544 | B1 | * | 2/2001 | Mino .......................... 360/126 |
| 6,198,600 | B1 | | 3/2001 | Kitao et al. |

FOREIGN PATENT DOCUMENTS

| JP | 54068619 | A | * | 6/1979 |
| JP | 56-022217 | | | 3/1981 |
| JP | 56-090411 | | | 7/1981 |
| JP | 57-098118 | | | 6/1982 |
| JP | 1-133274 | | | 5/1989 |
| JP | 2-134717 | | | 5/1990 |
| JP | 3-146682 | | | 6/1991 |
| JP | 3-288317 | | | 12/1991 |
| JP | 3-292605 | | | 12/1991 |

OTHER PUBLICATIONS

"Magneto–inductive element"; Mohri, K.; Kawashima, K.; Kohzawa, T.; Yoshida, H.; Magnetics, IEEE Transactions on, vol. 29, Issue: 2, Mar. 1993; pp. 1245–1248.*

* cited by examiner

*Primary Examiner*—Paul D. Kim
(74) *Attorney, Agent, or Firm*—Burgess & Bereznak (57) ABSTRACT

A method of manufacturing a magnetic head device includes forming a thin film magnetic head element over a substrate, the thin film magnetic head element including a magnetoresistance (MR) element. The substrate is cut such that the MR element is exposed on a side surface of the substrate. The side surface is then polished. Afterward, a magnetically degenerated layer is removed from the thin film magnetic head element along the side surface. It is emphasized that this abstract is provided to comply with the rules requiring an abstract that will allow a searcher or other reader to quickly ascertain the subject matter of the technical disclosure. It is submitted with the understanding that it will not be used to interpret or limit the scope or meaning of the claims.

27 Claims, 5 Drawing Sheets

METHOD OF MANUFACTURING A MAGNETIC HEAD DEVICE

The present application is a Divisional of prior application Ser. No. 09/438,346, filed Nov. 11, 1999, now abandoned, entitled, "Magnetic Head Device, And Method Of Its Manufacture".

BACKGROUND OF THE INVENTION

1. Field of the Invention

This invention concerns a magnetic head device provided with a magnetoresistance effect-type thin film magnetic head element for reproduction, and the method for its manufacture.

2. Background Information

The magnetic head devices present in hard disk devices and other equipment are provided with a thin film magnetic head element on the trailing-side surface of a slider mounted on a suspension. The magnetic gap of the magnetic head element is exposed on a surface of the slider facing the media (called the air bearing surface or "ABS") opposing the magnetic recording media. The magnetic head devices are used to perform magnetic recording of information onto and reproduction from magnetic disks or other magnetic recording media.

Trends toward higher recording densities in recent years have been accompanied by the widespread adoption of thin film magnetic head elements. Thin film magnetic head elements are integrated by layering a magnetoresistance head. A magnetoresistance effect element is used as a magnetic reproduction element part for readout of information recorded onto magnetic recording media and an induction-type magnetic head (inductive head) is used for recording.

The construction of the aforementioned magnetic head device has conventionally relied on the following processes. First, numerous thin film magnetic head elements, comprised of multiple layers fabricated using vacuum thin film fabrication techniques, are formed in a lattice array on top of a disc-shaped wafer comprised of an AlTiC substrate ($Al_2O_3$-TiC substrate). Next, the wafer is cut to separate each head block. Then, by performing the desired machining and other processing for a head block, a slider is constructed.

In the aforementioned magnetic head device, the aforementioned cut surface becomes the ABS (air bearing surface) of the slider. Because high precision is required in the machining of this ABS in order to improve the contact start-stop ("CSS") durability and other characteristics, a polishing jig is used for polishing after the aforementioned cutting, in order to flatten the ABS, and in order that the stripe height (SH) of the magnetoresistance effect element is the desired value.

Because the aforementioned polishing process consists of mechanical surface polishing, a large stress acts on the surface layer part of the polished ABS, and because of machining strain induced by the stresses and similar causes, the magnetic properties of the surface layer part are changed, and a magnetically degenerated layer is formed.

The magnetically degenerated layer is an extremely thin layer, of thickness approximately 1000 Å. However, due to the narrowing of the stripe heights of magnetoresistance effect elements with still greater increases in areal recording densities in recent years, the degradation of the output characteristic resulting from the existence of a the magnetically degenerated layer is becoming too great to be ignored.

Hence an objective of this invention is to alleviate the degradation of the output characteristics arising from mechanical polishing of the ABS of the slider in magnetoresistance effect-type magnetic head devices.

SUMMARY OF THE INVENTION

A magnetic head device is disclosed. In one embodiment, the magnetic head device includes a slider having a side surface, a thin film magnetic head element formed by layering on the side surface and a magnetoresistance effect element included in the thin film magnetic head element. The magnetoresistance effect element is exposed on the side surface to oppose a magnetic recording media. A degenerated layer produced by polishing on the side surface to oppose the magnetic recording media is removed by dry etching over a region including component parts of the thin film magnetic head element.

BRIEF DESCRIPTION OF THE DRAWINGS

The present invention detailed illustrated by way of example and not limitation in the accompanying figures.

DESCRIPTION OF SYMBOLS

1 Magnetic head device
2 Substrate (slider)
3 Thin film magnetic head element
4 Reproduction element part (magnetoresistance effect head)
5 Magnetoresistance effect element
R Magnetically degenerated layer

DETAILED DESCRIPTION

In order to achieve the aforementioned objective, in this invention the following technical means was devised.

That is, in this invention, a magnetic head device, in which is formed by layering on one side surface of a slider a thin film magnetic head element having a magnetic reproduction element part principally comprised of a magnetoresistance effect element (MR element), and with the aforementioned magnetoresistance effect element exposed on the side opposing the magnetic recording media, is characterized by the removal by dry etching, at least over a region including the component parts of the thin film magnetic head element, of the magnetically degenerated layer produced on the exposed side of the magnetoresistance effect element by polishing of the surface opposing the magnetic recording media (that is, the ABS). After dry etching, the entire ABS may be coated with diamond-like carbon ("DLC") or some other material.

By means of said magnetic head device, even if mechanical polishing of the ABS is performed in order to flatten the ABS and set the MR element stripe height, the degenerated layer arising from the polishing is removed by ion milling or other dry etching, so that either the degenerated layer does not exist at all, or the depth of the degenerated layer is reduced sufficiently not to pose a problem for output characteristics. In this way, by removing or reducing machining strain, the output is stabilized.

In order to maximize the magnetoresistance effect in the magnetic reproduction part of this magnetic head device, a shielded MR head construction is widely adopted in which high-permeability shield layers are formed by layering above and below the MR element, with a nonmagnetic gap layer intervening. In order to realize maximum flux efficiency in this shielded construction, the stripe height (depth) of the MR element is optimized. The stripe heights of recent MR elements are 1 μm or less, and hereafter it is expected that stripe heights will be further reduced. On the other hand, as described above, the degenerated layer caused by mechanical polishing of the ABS is, using current polishing techniques, at most approximately 1000 Å.

Hence during formation by layering of the MR element, the MR element layer is formed to a height equal to the target value of the MR element stripe height plus the depth of the aforementioned degenerated layer, and after the ABS polishing process the magnetically degenerated layer produced in the surface layer part of the ABS is removed, so that the final stripe height of the MR element is equal to the target value; by this means almost none of the magnetically degenerated layer exists in the surface layer part of the MR element and shield layer, and moreover an MR head is obtained with an extremely small stripe height.

In other words, in this invention, a method of manufacture of a magnetic head device with a thin film magnetic head element formed by layering on a side surface of a slider, including a process of forming by layering on a side surface of a slider a thin film magnetic head element having a magnetic reproduction element part principally comprised of a magnetoresistance effect element, and a process of polishing the side surface of the magnetic head device opposing the magnetic recording media, is characterized by the inclusion of a process in which, at the time of the aforementioned formation by layering, the aforementioned magnetoresistance effect element is formed to a height equal to the target height of the stripe of said element plus the depth of the magnetically degenerated layer produced by the aforementioned polishing, and in which, after the aforementioned polishing process, dry etching is used to remove material in a region containing at least the component layers of the aforementioned magnetic reproduction element part on the surface opposing the magnetic recording media, until the stripe height of the magnetoresistance effect element is at the target height.

Further, dry etching of the ABS layer part after polishing of the ABS may be performed to a depth of $\frac{1}{30}$ or greater but less than $\frac{1}{10}$ of the stripe height immediately after the polishing process. In this way, by taking the MR element stripe height as reference to etch to a constant proportion of the depth, it is possible to appropriately remove the degenerated layer in the thin film magnetic head element containing the magnetoresistance effect element, without the MR element stripe height becoming too thin, And it is thought that, with respect to the magnetically degenerated layer, the nearer to the surface layer part, the greater is the machining strain, so that by removing the surface layer part, the output characteristic is greatly improved.

In the present invention, which is based on this knowledge, a method of manufacture of a magnetic head device with a thin film magnetic head element formed by layering on a side surface of a slider, including a process of forming by layering on a side surface of a slider a thin film magnetic head element having a magnetic reproduction element part principally comprised of a magnetoresistance effect element, and a process of polishing the side surface of the magnetic head device opposing the magnetic recording media, is characterized by the inclusion of a process, after the aforementioned polishing process, in which dry etching is used to remove material in a region containing at least the component layers of the aforementioned magnetic reproduction element part on the surface opposing the magnetic recording media, until a depth of $\frac{1}{30}$ or greater but less than $\frac{1}{10}$ the stripe height of the magnetoresistance effect element immediately after the polishing process. In this way, if the etching depth is determined as a proportion of the stripe height, using, for example, some convenient means of stripe height measurement in order to obtain an appropriate value for the amount of polishing in the polishing process, then the etching amount can also be measured.

Further, in this invention, a method of manufacture of a magnetic head device in which a thin film magnetic head element is formed by layering on a side surface of a slider, including a process of formation by layering, on a side surface of the slider, of a thin film magnetic head element consisting of a plurality of component layers including a magnetoresistance effect element film, and a process of polishing the side surface opposing the magnetic recording media of the magnetic head device, and in which the polishing process machines flat the end surface opposing the magnetic recording media of the thin film magnetic head element over a plurality of component layers, is characterized by the inclusion of a process for removal by dry etching of a region containing at least the magnetoresistance effect element film among the magnetically degenerated layer, caused by the aforementioned polishing process, on the surface part of the side surface opposing the magnetic recording media of the magnetic head device. It is preferable that dry etching can be used for removal over a region extending over the entirety of component layers of the thin film magnetic head element.

In magnetic head devices in which the thin film magnetic head element is formed by integrated layering of a magnetoresistance effect head for reproduction and an inductive head for recording, when using aluminum nitride or similar as the material comprising the reproduction magnetic gap layer of the magnetoresistance effect head, and when using silicon oxide, tantalum pentoxide, a beryllium-copper alloy or similar as the material comprising the recording magnetic gap layer of the inductive head, these component materials have, compared with alumina, polishing properties close to those of the shield layer in magnetoresistance effect heads and the component materials (permalloy and so on) of the magnetic poles of inductive heads. Thus by means of mechanical polishing of the ABS, the end surface on the side opposing the magnetic recording media of the thin film magnetic head element is flattened over multiple component layers. Hence this invention can be especially advantageous in the case of magnetic head elements using such component materials.

In cases where the depth of the MR element changes with the width direction, the stripe height in this invention is the maximum depth within the effective region for magnetic field detection.

Below embodiments of the invention are explained, referring to the drawings.

Figure 1:
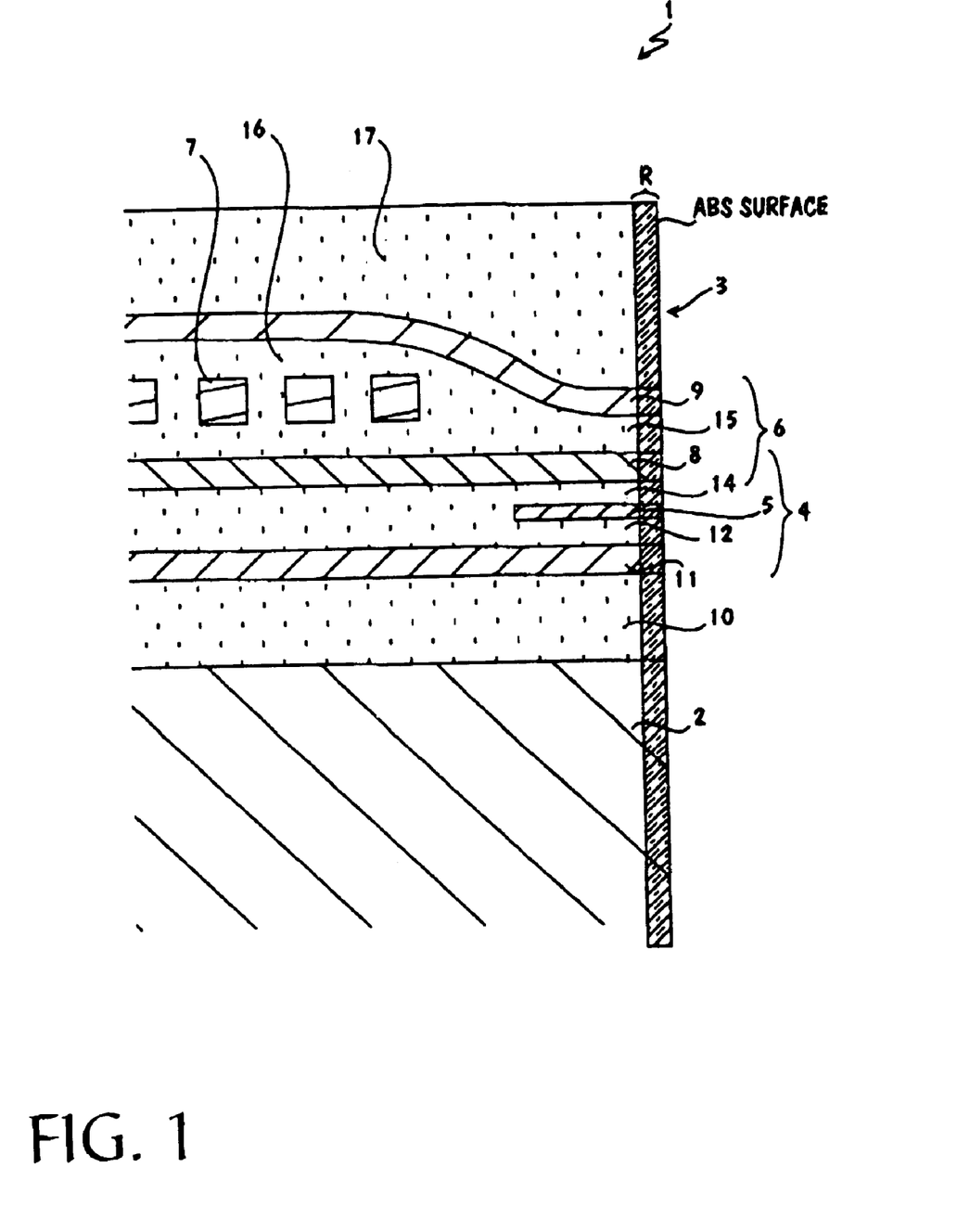
FIG. 1 is an expanded cross-sectional diagram of principal parts of a magnetic head device of one embodiment of this invention.
Figure 2:
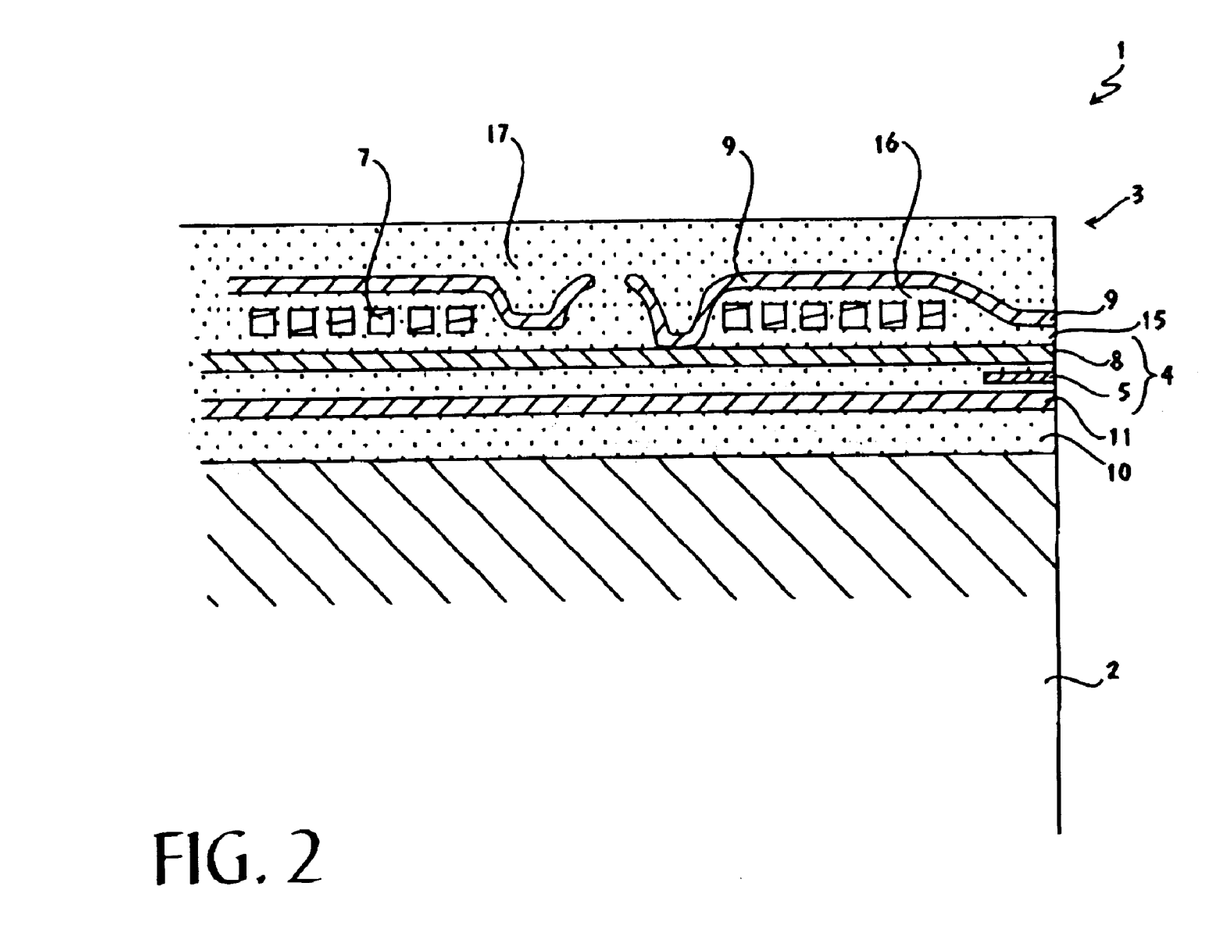
FIG. 2 is a cross-sectional diagram of the same magnetic head device.
Figure 3:
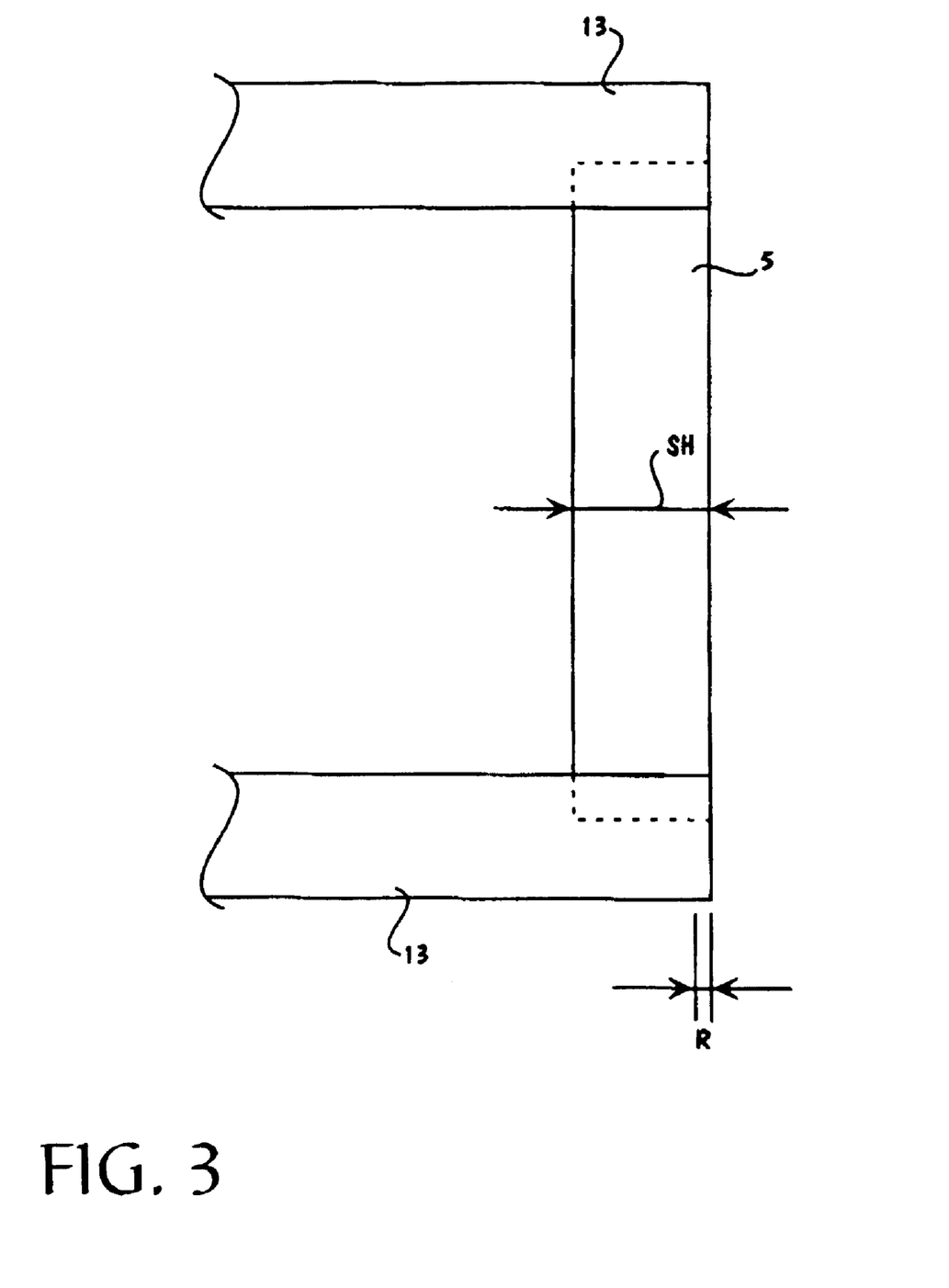
FIG. 3 is an expanded plane diagram of the magnetoresistance effect element of the same magnetic head device.

FIGS. 1 to 3 show the magnetic head device 1 of an embodiment of this invention. The magnetic head device 1 is constructed by the formation by layering of a thin film magnetic head element 3, consisting of multiple component layers, on the surface on one side of a slider (substrate) 2, that is, on the trailing-side surface. The element 3 is constructed by layering vertically in an integrated manner a magnetoresistance effect head for reproduction 4 (a magnetic reproduction element part principally comprised of a magnetoresistance effect element 5) and an inductive head for recording 6 (a magnetic recording element part principally comprised of an electromagnetic coil 7 and upper and lower magnetic poles 8, 9).

The magnetoresistance effect head 4 is constructed by layering in order, on top of an AlTiC substrate 2 ($Al_2O_3$-TiC substrate) on the surface of which is layered an undercoat 10 consisting of a nonmagnetic material, a lower magnetic shield layer 11 consisting of a soft magnetic material; a lower-half gap layer 12 consisting of a nonmagnetic material; a magnetoresistance effect element film 5 the electrical resistance of which changes in response to an external magnetic field; an electrode layer 13 connected to both ends of the film 5; an upper-half gap layer 14 consisting of a nonmagnetic material; and an upper magnetic shield layer 8 consisting of a soft magnetic material.

As the component materials of each layer, for example, alumina ($Al_2O_3$) can be used as the undercoat 10; permalloy (NiFe alloy), FeAl alloy, or a Co-base amorphous alloy as the magnetic shield layers 8, 11; aluminum nitride (AlN) or aluminum nitrate ($AlNO_3$) as the magnetic gap layers 12, 14; and copper (Cu) as the electrode layer 13; and other appropriate materials can also be used. If the aforementioned materials are used in the magnetic gap layers 12, 14, because of their excellent thermal conductivity, the effect of heat dissipation from the MR element 5 is excellent, and so thermal reliability can be improved.

As the aforementioned magnetoresistance effect element 5, the AMR element which is widely known in the prior art, a spin-valve element, granular element or other GMR element, or a TMR element or similar can be used; in this embodiment, it is formed in a rectangular shape with long side in the width direction, as shown in FIG. 3. The end surface of the element 5 is exposed at the ABS (the surface opposing the magnetic recording media) of the slider 2, and by detecting changes in the electrical resistance which occur in response to the magnetic field from the magnetic recording media, information magnetically recorded in the media can be reproduced.

The stripe height ("SH") of this element 5 is defined as the depth of the element 5 from the ABS. In this embodiment, the depth of the element 5 is shown as being the same across the width direction, but the element 5 can also be formed such that the central part is of narrow width. In this case, in this invention, the stripe height SH is defined as the greatest depth of the effective region.

The aforementioned inductive head 6 is constructed by layering in order a lower magnetic pole layer 8 consisting of a soft magnetic material; a magnetic gap layer 15 consisting of a nonmagnetic material; an inductive coil layer 7 consisting of an electrically conducting material; an insulating layer 16 consisting of a nonmagnetic material and covering the coil layer 7; and an upper magnetic pole layer 9 consisting of a soft magnetic material. The lower magnetic pole layer 8 of the head 6 is constructed of the soft magnetic layer common to the upper magnetic shield layer of the magnetoresistance effect head; by means of this common use of the layer 8, the overall thickness of the element is reduced.

The lower magnetic pole layer 8 and upper magnetic pole layer 9 are connected at the center of the inductive coil 7, and by applying a current to the coil 7, a magnetic field is generated between the ends of the upper and lower magnetic poles 8, 9; by inverting the magnetic moment of the magnetic material layered on the surface of the magnetic recording media under the action of the magnetic field, information can be recorded.

The entirety of the aforementioned thin film magnetic head element 3 is covered by a protective layer 17 consisting of a nonmagnetic material; and terminals 18 electrically connected to both ends of the magnetoresistance effect element 5 and to both ends of the inductive coil 7 are exposed at the surface of the protective layer 17.

As the component materials of each of the aforementioned layers, or example, permalloy, an FeAl alloy, or a Co-base amorphous alloy can be used as the magnetic pole layers 8, 9; tantalum pentoxide ($Ta_2O_5$), a beryllium-copper alloy (BeCu), or silicon oxide ($SiO_2$) as the magnetic gap layer 15 and insulating layer 16; and copper as the coil layer 7.

As the magnetic gap layer 15, alumina, an alloy containing alumina, or a ceramic or other alumina-based nonmagnetic material may be used; but it is preferable that a non-alumina-based nonmagnetic material be used.

The magnetic gap layers 12, 14 of the magnetoresistance effect head 4 are exposed on the surface of the slider 2 opposed at the magnetic recording media (the ABS), and a reproduction magnetic gap is comprised of this exposed part. Similarly, the magnetic gap layer 15 of the inductive head 6 is also exposed at the ABS, and by means of the exposed part a recording magnetic gap is comprised.

Figure 4:
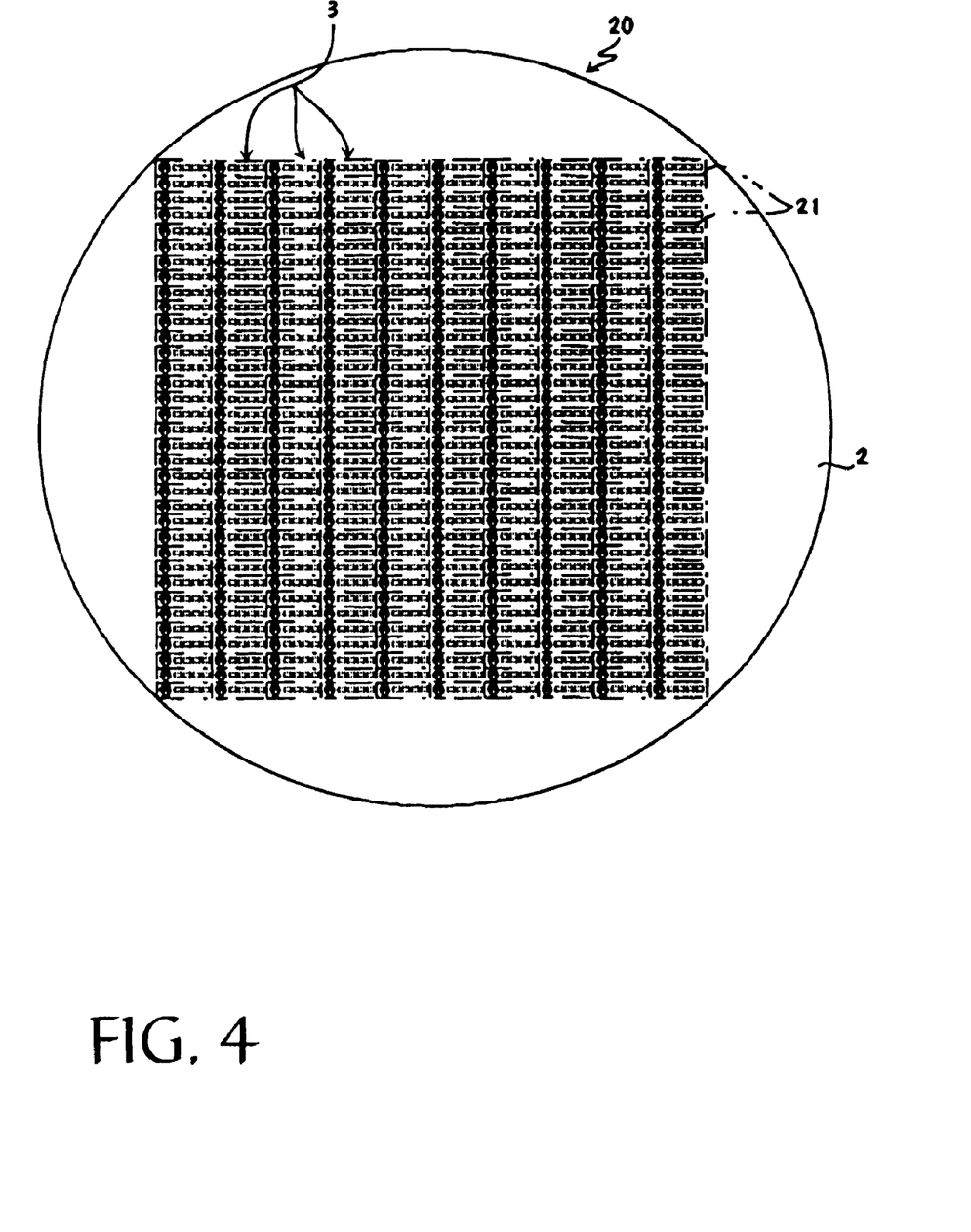
FIG. 4 is a plane diagram of the state of formation by layering in a lattice array of numerous thin film magnetic head elements on a wafer surface, in the manufacturing process of the same magnetic head device.
Figure 5:
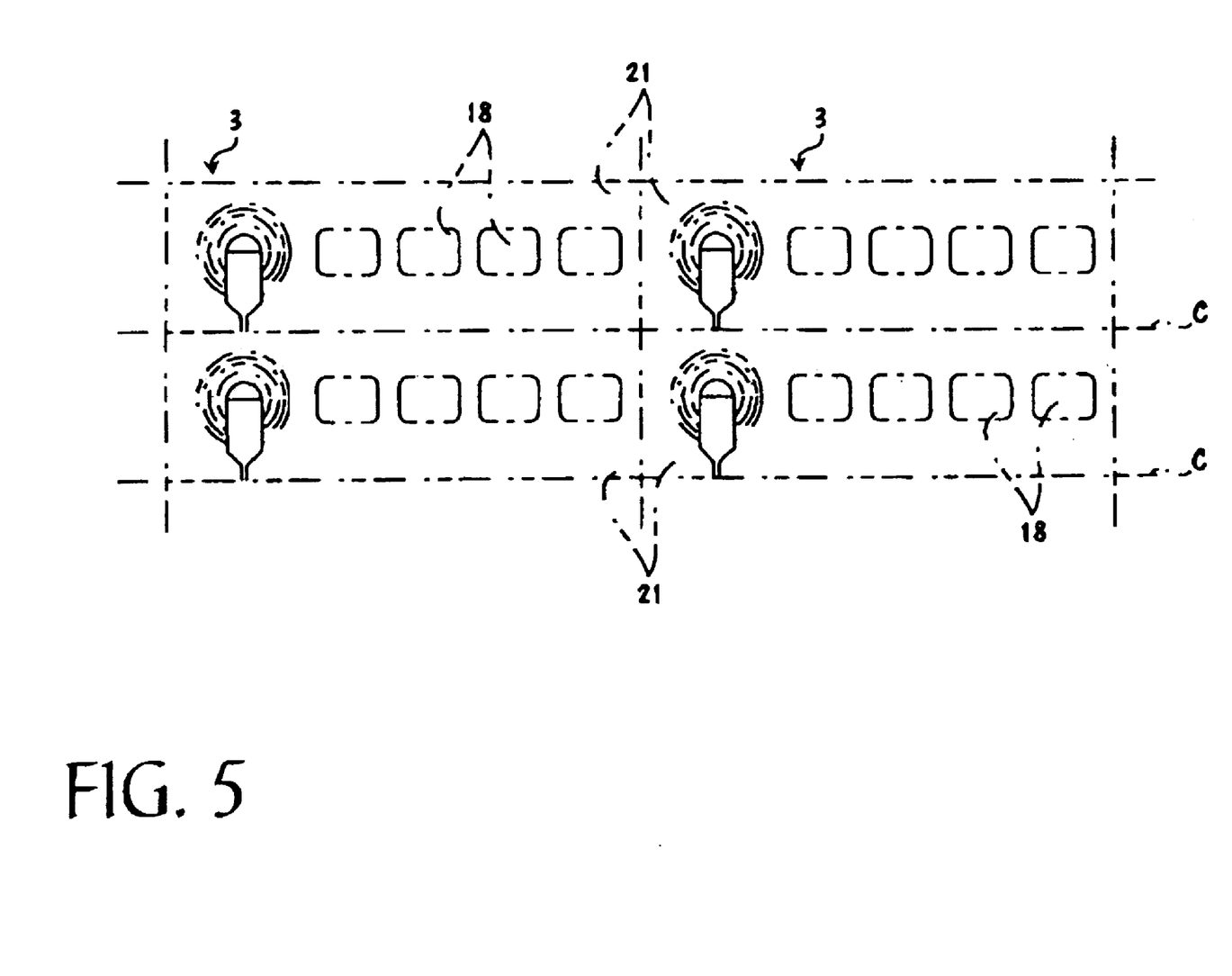
FIG. 5 is an expanded diagram of FIG. 4.

Next, an embodiment of the method of manufacture of the aforementioned magnetic head device 1 is explained, with reference to FIG. 4 and FIG. 5.

As shown in FIG. 4, vacuum thin film formation techniques and patterning techniques using photosensitive material are employed to form by layering many of the aforementioned thin film magnetic head elements 3 in a lattice array on the surface of a disc-shaped wafer (substrate) 20 consisting of an AlTiC substrate, glass substrate or similar.

After formation by layering of the thin film magnetic head elements 3 and protective layer 17, the wafer 20 on the surface of which numerous elements 3 are formed by layering is cut into individual head blocks 21 including each of the elements 3 and the terminals 18 connected to the elements 3. By subjecting the head block 21 to machining to a prescribed slider shape, the aforementioned slider 2 is formed. Cutting of single rows of head blocks 21 in the horizontal direction can be performed either after the slider-shape machining (etching) described below, or before etching.

The cut surface C on the bottom side of each of the head blocks 21 in FIG. 4 and FIG. 5 becomes the surface opposing the magnetic recording media, that is, the ABS. Because this ABS must be machining-shaped with high precision in order to improve the CSS durability and other characteristics of the flying-type magnetic head device 1, in order to alleviate roughness in cut surfaces resulting from cutting of each head block 21, mechanical polishing of the ABS is performed using an appropriate polishing device over several processes, to flatten the ABS. Further, in order to ensure that the SH of the magnetoresistance effect element 5 is a suitable value as a result of the polishing process, an appropriate means of measurement of the stripe height SH may used to measure the stripe height while performing polishing. Also, it is desirable that by means of the final polishing, the edges on the ABS side of each of the component layers 11, 12, 5, 14, 8, 15, 19 of the thin film magnetic head element 3 are polished precisely such that they are nearly flat. To this end, it is desirable that as the component materials of the magnetic gap layers 12, 14, 15, nonmagnetic materials of hardness approximately equal to that of the component materials of the magnetic layers 8, 9, 11 be used.

By means of the ABS polishing, as shown in FIG. 1, a machining-degenerated layer R (the oblique-shaded part on the right edge) of thickness approximately 1000 Å is formed at the surface part of the ABS. In particular, the magnetic properties of the edges on the ABS side of the upper and lower shields 11, 15, the upper and lower magnetic poles 15, 19, and the magnetoresistance effect element 5, all of magnetic materials, are degenerated due to machining strain; and it has become clear that with the tendency toward the smaller stripe heights SH of magnetoresistance effect elements 5 in recent years, the existence of a magnetically degenerated layer R in a magnetoresistance head is too great to be ignored.

In this embodiment, after the final polishing process for the ABS, ion milling or other dry etching is used to remove either the entire degenerated layer R, or part of a region including the component parts of the thin film magnetic head element 3, so as to remove the degenerated layer R produced on the ABS side of the magnetoresistance effect element 5. Further, in this embodiment, by removing the degenerated layer R produced on the ABS side of the upper and lower shield layers 8, 11 of the magnetoresistance effect element 6, the output characteristics for the magnetic recording and reproduction part as a whole are improved.

The amount of the aforementioned etching can be made between $1/30$ and $1/10$ of the stripe height SH immediately after the polishing process, and is preferably set appropriately according to the thickness of the degenerated layer R actually produced. In this way, by taking as reference the stripe height SH, the means of measurement of the stripe height used in the aforementioned polishing process can be utilized, so that even without additional devices, the amount of etching can be set to an appropriate value.

A trend to reduce the target value of the stripe height SH (that is, the final stripe height) of the magnetoresistance effect element 5 is accompanied by an increase in the proportion of the thickness of the magnetically degenerated layer relative to the final stripe height. In the film fabrication processes for the element 5, by forming the magnetoresistance effect element 5 to a height (stripe height) equal to the target stripe height SH plus the depth of the magnetically degenerated layer expected to be produced by polishing of the ABS, and by dry etching the ABS until the stripe height of the element 5 is equal to the target height after the aforementioned final polishing process of the ABS, a magnetoresistance effect element 5 is obtained with no degenerated layer, and which is extremely narrow.

After etching, the ABS can be coated with DLC in order to protect the magnetic gap.

Further, by using as the component material of the gap layers 12, 14, 16 a non-alumina-based nonmagnetic material with an etch rate about the same as the component materials of the magnetic layers 8, 9, 11, during dry etching of the ABS the gap layers 12, 14, 16 can be etched similarly to the magnetic layers 11, 15, 19, so that the occurrence of protrusions and depressions after etching can be prevented.

Apart from etching to remove the aforementioned degenerated layer R, the exposed part of the thin film magnetic head element 3 is protected by resist, and slider-shape machining is performed by etching to form the ABS rail parts and airflow depression part of the slider 2. This slider-shape machining may be performed before the etching process to remove the degenerated layer R, or may be performed afterward.

This invention is not limited to the aforementioned embodiments, but can be modified in design as appropriate. For example, in the aforementioned embodiments, an inductive head 6 is formed on top of the magnetoresistance effect head 4; but this invention can be applied to a thin film magnetic head in which the inductive head is first formed on the substrate 2, and the magnetoresistance effect head 4 is then formed on top.

In this invention, dry etching is used to remove the degenerated layer produced on the ABS side of the magnetoresistance effect element by the final polishing process of the slider ABS, so that even if the stripe height in magnetoresistance effect-type magnetic head devices is reduced to accompany the higher recording densities of recent years, the reproduction output can be stabilized, enabling still higher recording densities.

What is claimed is:

1. A method of manufacturing a magnetic head device, comprising:
   forming a thin film magnetic head element over a substrate, the thin film magnetic head element including a magnetoresistance (MR) element;
   cutting the substrate, the MR element being exposed on a side surface of the substrate;
   polishing the side surface, thereby forming a magnetically degenerated layer on the side surface, after polishing the MR element having a stripe height that is substantially equal to a target stripe height plus an additional dimension, the additional dimension being substantially equal to a depth of the magnetically degenerated layer; and
   removing the magnetically degenerated layer from at least a region of the side surface that includes the MR element.

2. The method of claim 1 wherein removing the magnetically degenerated layer comprises etching the at least said region.

3. The method of claim 1 wherein removing the magnetically degenerated layer comprises milling the at least said region.

4. The method of claim 1 wherein forming the thin film magnetic head element comprises:
   forming a first shield layer over the substrate;
   forming a first half gap layer over the first shield layer;
   forming the MR element over the first half gap layer;
   forming a second half gap layer over the MR element; and
   forming a second shield layer over the second half gap layer.

5. The method of claim 1 wherein removing the magnetically degenerated layer comprises etching the magnetically degenerated layer until the stripe height of the MR element is substantially equal to the target stripe height.

6. The method of claim 1 further comprising:
   coating the side surface with a diamond-like carbon material after removing the magnetically degenerated layer.

7. The method of claim 1 further comprising forming a nonmagnetic undercoat layer on the substrate.

8. The method of claim 1 further comprising forming air-bearing surface rail parts in the side surface of the substrate.

9. A method of manufacturing a magnetic head device, comprising:
  forming a thin film magnetic head element over a substrate, the thin film magnetic head element including a magnetoresistance (MR) element;
  cutting the substrate, the MR element being exposed on a side surface of the substrate;
  polishing the side surface, thereby forming a magnetically degenerated layer on the side surface, after polishing the MR element having a stripe height that is substantially equal to a target stripe height plus an additional dimension, the additional dimension being substantially equal to a depth of the magnetically degenerated layer; and
  etching the magnetically degenerated layer from at least a region of the side surface that includes the MR element until the stripe height of the MR element is substantially equal to the target stripe height.

10. The method of claim 9 wherein forming the thin film magnetic head element comprises:
  forming a first shield layer over the substrate;
  forming a first half gap layer over the first shield layer;
  forming the MR element over the first half gap layer;
  forming a second half gap layer over the MR element; and
  forming a second shield layer over the second half gap layer.

11. The method of claim 10 further comprising:
  forming an inductive head element over the substrate, the inductive head element including upper and lower magnetic pole layers separated by a gap layer, wherein the lower magnetic pole layer is common with the second shield layer.

12. The method of claim 11 wherein the gap layer comprises a material consisting essentially of silicon oxide, tantalum pentoxide, or a beryllium-copper alloy.

13. The method of claim 11 wherein the gap layer and the first and second half gap layers comprise a nonmagnetic material other than alumina.

14. The method of claim 11 wherein the first shield layer and the upper and lower magnetic pole layers comprise a magnetic material having an etch rate that is substantially the same as an etch rate of the nonmagnetic material.

15. The method of claim 9 wherein the magnetically degenerated layer is approximately 1000 angstroms thick.

16. The method of claim 9 further comprising:
  coating the side surface with a diamond-like carbon material after removing the magnetically degenerated layer.

17. The method of claim 9 further comprising forming a nonmagnetic undercoat layer on the substrate.

18. The method of claim 9 further comprising forming air-bearing surface rail parts in the side surface of the substrate.

19. A method of manufacturing a magnetic head device, comprising:
  forming a thin film magnetic head element over a substrate, the thin film magnetic head element including a magnetoresistance (MR) element having a stripe height;
  cutting the substrate, the MR element being exposed on a side surface of the substrate;
  polishing the side surface to form an air-bearing surface (ABS) with a magnetically degenerated layer; and
  etching the ABS to a depth of $1/30$ or greater, but less than $1/10$, of the stripe height, wherein etching of the ABS substantially removes the magnetically degenerated layer.

20. The method of claim 19 wherein forming the thin film magnetic head element comprises:
  forming a first shield layer over the substrate;
  forming a first half gap layer over the first shield layer;
  forming the MR element over the first half gap layer;
  forming a second half gap layer over the MR element; and
  forming a second shield layer over the second half gap layer.

21. The method of claim 20 further comprising:
  forming an inductive head element over the substrate, the inductive head element including upper and lower magnetic pole layers separated by a gap layer, wherein the lower magnetic pole layer is common with the second shield layer.

22. The method of claim 21 wherein the first shield layer and the upper and lower magnetic pole layers comprise a magnetic material having an etch rate that is substantially the same as an etch rate of the nonmagnetic material.

23. The method of claim 20 wherein the gap layer comprises a material consisting essentially of silicon oxide, tantalum pentoxide, or a beryllium-copper alloy.

24. The method of claim 19 wherein the magnetically degenerated layer is approximately 1000 angstroms thick.

25. The method of claim 19 further comprising:
  coating the side surface with a diamond-like carbon material after removing the magnetically degenerated layer.

26. The method of claim 19 further comprising forming a nonmagnetic undercoat layer on the substrate.

27. The method of claim 19 further comprising forming air-bearing surface rail parts in the side surface of the substrate.

* * * * *